United States Patent [19]
Gold et al.

[11] Patent Number: 5,565,077
[45] Date of Patent: Oct. 15, 1996

[54] TRANSVERSE FLOW SELF-HEATING ELECTRICALLY CONDUCTIVE SORPTION SYSTEM

[75] Inventors: Harris Gold, Lexington; Richard E. Hicks, Waban; Andrew C. Harvey, Waltham; John F. McCoy, III, No. Chelmsford, all of Mass.

[73] Assignee: Foster Miller, Inc., Waltham, Mass.

[21] Appl. No.: 312,412

[22] Filed: Sep. 26, 1994

[51] Int. Cl.$^6$ .................................................. B01D 17/06
[52] U.S. Cl. ........................... 204/666; 204/660; 502/5; 502/56; 422/307
[58] Field of Search ................................. 204/186, 302, 204/308; 34/246; 502/56, 5; 422/307

[56] References Cited

U.S. PATENT DOCUMENTS

| | | | |
|---|---|---|---|
| 3,634,028 | 1/1972 | Hohne | 252/411 |
| 4,261,857 | 4/1981 | Nakao | 252/420 |
| 4,421,651 | 12/1983 | Burkholder et al. | 502/56 |
| 4,717,697 | 1/1988 | Kunugiza et al. | 502/56 |
| 5,069,038 | 12/1991 | Peinze | 62/18 |
| 5,187,131 | 2/1993 | Tiggelbeck et al. | 502/56 |

FOREIGN PATENT DOCUMENTS

| | | |
|---|---|---|
| 104749 | 4/1984 | European Pat. Off. . |
| 50-152994 | 12/1975 | Japan . |
| 207547 | 11/1923 | United Kingdom . |
| 285480 | 2/1928 | United Kingdom . |

*Primary Examiner*—John Niebling
*Assistant Examiner*—Kishor Mayekar
*Attorney, Agent, or Firm*—Iandiorio & Teska

[57] ABSTRACT

A transverse flow, self-heating electrically conductive sorption system for separating species of different adsorption characteristics in a fluid includes a containment vessel, an electrically conductive permeable sorbent bed having a multiplicity of adsorption sites in said vessel; a porting structure for supplying contaminated fluid in a first direction at one surface of the bed and for receiving the contaminated fluid at another surface of the bed; and a pair of spaced electrodes for applying current through the bed in a second direction transverse to the first direction to self-heat the electrically conductive sorbent bed.

7 Claims, 3 Drawing Sheets

TRANSVERSE FLOW SELF-HEATING ELECTRICALLY CONDUCTIVE SORPTION SYSTEM

FIELD OF INVENTION

This invention relates to an electrically conductive sorption system for separating species of different adsorption characteristics in a fluid, and more particularly to such a system which is self heating, permits the electrical resistance and the flow resistance to be modified independently, and addresses the unequal electrical resistance of the bed due to compaction of the particulate bed material by gravity.

BACKGROUND OF INVENTION

Activated carbon bed structures are utilized in sorption systems. The carbon beds used in these systems typically have a multiplicity of adsorption sites which capture contaminants and other adsorbates (e.g., water vapor) when contaminated fluid to be filtered is introduced to the bed. Typically there is a porting structure which supplies the contaminated fluid in one direction at one surface of the bed and receives decontaminated fluid at the other end of the bed substantially free of contaminants and other adsorbed species. After the adsorption sites become sufficiently occupied with contaminants and other adsorbed species the bed must be regenerated to remove the captured contaminants and other adsorbed species from the collection sites. This has been accomplished by providing an electric current through the carbon bed which contains conductive material such as iron filings (to conduct the electric current) to heat the bed and raise the bed temperature to an elevated level to facilitate regeneration of the bed. Generally, the electric current is provided to the bed by electrodes that are affixed to the surfaces of the bed where the contaminated fluid enters and the decontaminated fluid exits the bed. Thus, the fluid and electric current flow through the bed in the same direction. Since the electrodes are located in the fluid flow path, they interfere with the fluid flow and increase the fluid flow resistance.

When using electric current to heat the carbon bed it is advantageous to increase the electrical resistance of the bed to cause a greater voltage drop across the bed and thereby allow a lower electric current to be used for the same bed heating rate. To accomplish this, these systems simply increase the height of the bed, which does decrease the electric current flow; however, it also increases the fluid flow resistance. Thus, if the configuration of the carbon bed is modified to alter either the electric current flow or the fluid flow resistance, the other may be adversely affected. This is not a desirable trade-off.

Another problem that persists with using electric current to heat the carbon bed is that there is non-uniform electrical resistance throughout the bed due to the effects of gravity and the migration of smaller size particles to the bed bottom. That is, due to gravity there is more compaction at the bottom of the bed of the carbon and accordingly less electrical resistance due to improved contact between the carbon granules or pellets that comprise the bed. "Fines" of broken pellets or granules collect around points of contact between the larger carbon pellets or granules. This results in undesirable nonuniform electric heating of the bed.

In order to conduct the electric current through the carbon bed between electrodes in these systems, conducting materials such as iron are added to the carbon bed. This, however, introduces problems. The iron occupies space in the carbon bed which reduces the effectiveness of the bed as a decontamination and adsorption medium and the added material rusts or corrodes over time and loses its effectiveness as a conductor.

One prior art system (European Patent Application No. 83304795.4, Rintoul) discloses a method and apparatus for electrically heating columns of activated carbon to reactivate the carbon. This reactivation process is not accomplished in situ, however.

SUMMARY OF INVENTION

It is therefore an object of this invention to provide a self-heating, transverse flow electrically conductive sorption system.

It is a further object of this invention to provide a self-heating, transverse flow electrically conductive sorption system in which the configuration of the carbon bed may be modified to alter the electric current flow or fluid flow resistance through the bed without affecting the performance of the other.

It is a further object of this invention to provide such a self-heating, transverse flow electrically conductive sorption system in which the carbon bed is electrically self-heated by utilizing the carbon in the bed as the electrical conductor.

It is a further object of this invention to provide such a self-heating, transverse flow electrically conductive sorption system in which the electrodes that heat the carbon bed do not interfere with the fluid flow through the bed.

It is a further object of this invention to provide such a transverse flow electrically conductive sorption system in which the carbon bed has a more uniform electrical resistance.

It is a further object of this invention to provide such a transverse flow electrically conductive sorption system in which the bed is more uniformly heated during the regeneration process.

It is a further object of this invention to provide such a transverse flow electrically conductive sorption system in which the amount of current input into the bed to maintain a given power level and heating temperature is decreased without affecting the fluid flow.

The invention results from the realization that an improved more efficient sorption system can be achieved using an electrically conductive bed which can be self-heated by an electric current, and by directing the electric current and the fluid flow through the bed in directions transverse to one another so that modifications to the bed to increase electrical resistance will not necessarily alter the fluid flow characteristics of the bed. This invention results from the further realization that by separating the bed into a number of sections the resistance of the bed can be further increased without necessarily increasing the resistance to the flow of the fluid to be cleaned and that by horizontally sectioning and/or providing one or more sloping walls on the containment vessel for the bed the effects of unequal electrical resistance due to compaction of the particulate bed material by gravity can be compensated. Sloping electrodes can also compensate for lower resistivity at the bed bottom.

This invention features a transverse flow, self-heating electrically conductive sorption system for separating species of different adsorption characteristics in the fluid. There is a containment vessel and an electrically conductive permeable sorbent bed in the vessel having a multiplicity of adsorption sites. A porting structure supplies contaminated fluid in a first direction at one surface of the bed and receives the decontaminated fluid at another surface of the bed. A pair of spaced electrodes apply current through the bed in a second direction transverse to the first direction to self-heat the electrically conductive permeable sorbent bed.

In a preferred embodiment the sorbent bed may be granular or pelletized and it may be carbon which is activated carbon. The bed may be separated into a plurality of sections in the second direction and the sections may be connected in series electrically to increase the electrical resistance of the bed without increasing the flow resistance in the first direction. The bed may be separated horizontally into a plurality of sections of unequal height connected in series electrically, with the height of the sections increasing from the bottom to the top of the bed for compensating for the increasing electrical resistance of the bed from bottom to top due to compaction of the bed by gravity. The containment vessel may include an inclined wall for assuming a portion of the weight of the bed and reducing its compaction due to gravity for compensating for the increasing electrical resistance of the bed from bottom to top. The electrodes may be sloped and converge from the bottom of the bed to the top for compensating for the increasing electrical resistance of the bed from bottom to top. The sorbent bed may be a homogeneous material without additives or dopants to affect conductivity. The sorbent bed may be formed of particles.

BRIEF DESCRIPTION OF THE DRAWING

Other objects, features and advantages will occur to those skilled in the art from the following description of a preferred embodiment and the accompanying drawings, in which.

DISCLOSURE OF PREFERRED EMBODIMENT

Figure 1:
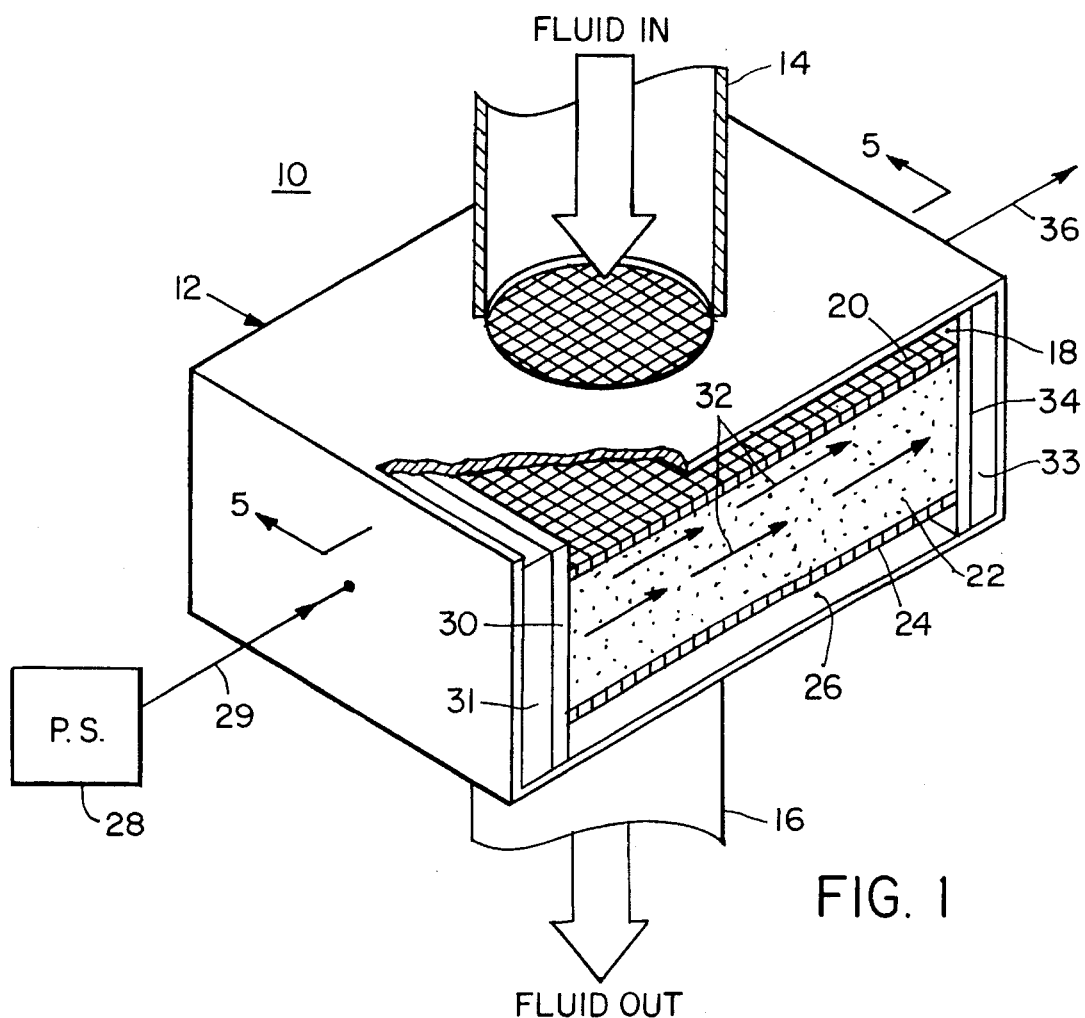
FIG. 1 is a three-dimensional view with portions broken away and in section of a transverse flow electrically conductive sorption system according to this invention.

This invention may be accomplished with an electrically conductive sorption system which includes a containment vessel made from an electrically insulating material. In the containment vessel is an electrically conductive permeable sorbent bed which has a multiplicity of adsorption sites such as granular or pelletized carbon, activated carbon or other material. There is a porting structure which supplies a contaminated fluid in one direction at one surface of the bed and receives the decontaminated fluid at the other surface of the bed. Typically the fluid is delivered through a conduit to a plenum, the fluid spreads out through the plenum, penetrates a screen or grid, moves through the sorbent bed out a second grid or screen to a second plenum, and from there to the output port.

The beds may be sectioned with porous electric insulation material (e.g., fiber glass cloth) or non-porous electric insulation material, as appropriate for controlling the flow.

A pair of spaced electrodes on opposite sides of the bed apply a current through the bed which is transverse to the path of the flow of the fluid through the bed. Since the flow of the fluid and the path of the current are transverse to one another, either one may have its geometry or configuration changed without affecting the performance of the other. For example, the electrical resistance of the bed may be increased without increasing or decreasing the flow resistance to the fluid flowing through the bed. Moreover, since the electric current flow and fluid flow are transverse, the configuration of the electrodes need not interfere with fluid flow.

For example, the bed may be sectioned vertically into two or more sections and the sections interconnected electrically in series in order to increase the electrical resistance of the bed or the bed resistance may be adjusted by application of external forces. The bed can be energized by single-phase or multi-phase power sources.

The application of the electric current directly to the substance of the sorbent bed to directly self-heat the bed effects a major improvement in efficiency and uniformity of the heating of the bed. There is no transfer loss as is associated with heating the bed with a gas that must itself first be heated. Heating the bed with a gas also introduces the problem of non-uniform heating of the bed. Attempts to improve the conductivity of the bed by adding iron or other conducting material to the carbon introduces additional problems: the iron takes the place of carbon, which reduces the effectiveness of the bed as a decontamination and adsorption medium and the iron or other material can rust or corrode and lose its effectiveness as a conductor over time. In order to overcome the non-uniformity of resistance of a granular conductive bed caused by the compaction of the granules due to gravity, the invention contemplates separating the bed horizontally into one or more sections so that the reduced cross-sectional area of the sections in the lower portion, will result in the same resistance as the upper portions which are less compacted by gravity. Alternatively, the bed may be separated by horizontal layer(s) into two or more equal cross-sectional area sections provided that the horizontal layer(s) separating the bed actually support the weight of the bed so that the resistances of the two sections are equal. Another approach to compensate for the effect of gravity on the uniformity of resistance is to provide sloping walls for the bed so that at least a portion of the weight of the bed can be assumed by the walls and thereby ease the force of compaction on the carbon bed itself.

The transverse flow electrically conductive sorption system according to this invention may be used in any sorption system application regardless of size, from large scale industrial applications to personal size (e.g., respirator) portable units.

There is shown in FIG. 1 an electrically conductive sorption system 10 according to this invention including a containment vessel 12 having an input port 14 and an output port 16. Input port 14 feeds plenum 18 which delivers contaminated fluid through grid or screen 20 to electrically conductive permeable sorbent carbon bed 22. The fluid is cleansed in carbon bed 22 and exits through screen or grid 24 into plenum 26 and then through output port 16. Electric power is supplied from power supply 28 through leads 29 to electrode 30. The current flows across carbon bed 22 in a direction as indicated by arrows 32 to electrode 34 and then leads 36. Leads 29 and 36 and electrodes 30 and 34 are suitably electrically insulated from the surrounding environment such as container 12 and screens or grids 20 and 24. Also, insulators 31 and 33 are provided to insulate electrodes 30 and 34 from the environment outside sorption system 10. The bed is homogeneous, for example, carbon with no additives or dopants to affect conductivity.

Figures 2B, 2C:
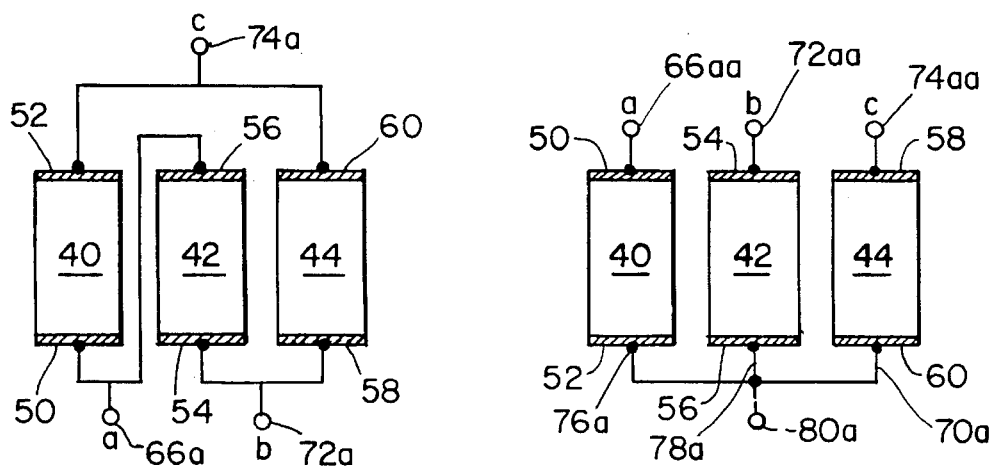
FIG. 2B is a top plan view of the electrically conductive permeable sorbent bed of FIG. 2A depicting an alternative, three phase, electrical delta connection.
FIG. 2C is a view similar to the view of FIG. 2B depicting an alternative, three phase electrical, wye connection.
Figure 2A:
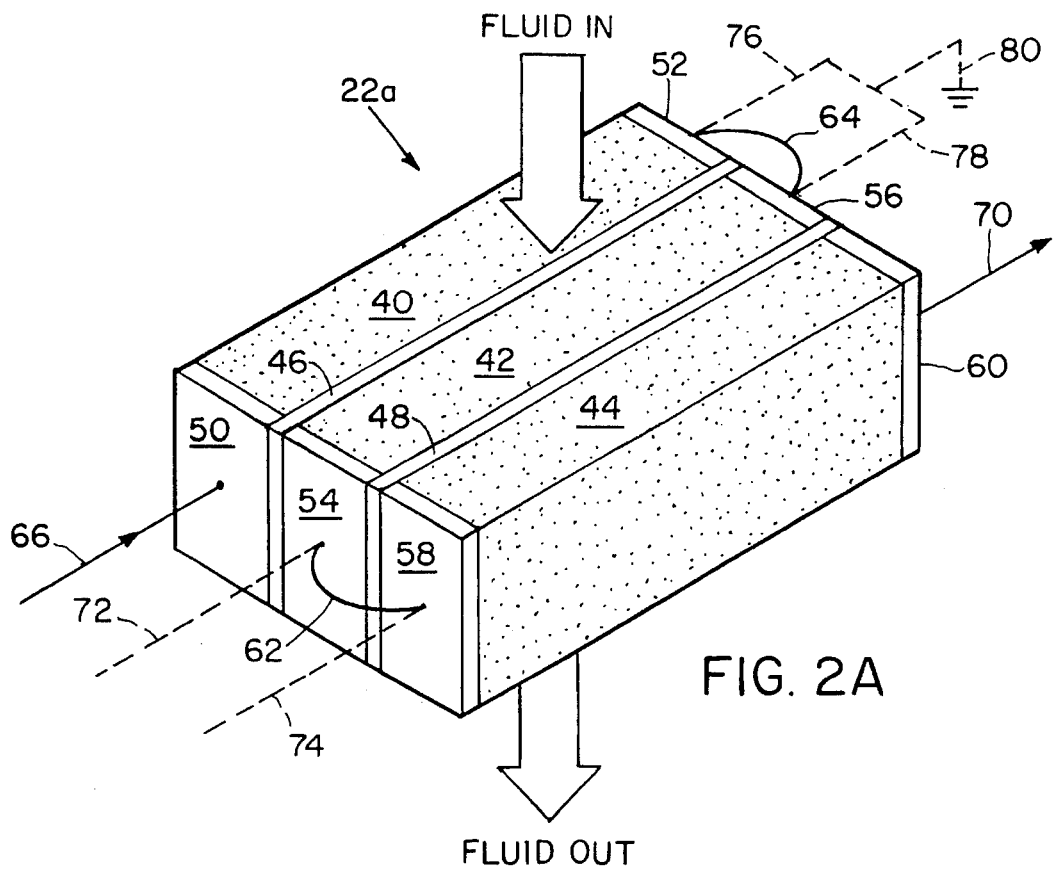
FIG. 2A is an enlarged schematic three-dimensional view of an electrically conductive permeable sorbent bed similar to that in FIG. 1, sectioned to increase the length of its electrical path and resistance.

In order to increase the electrical resistance of the bed without increasing the flow resistance of the bed, bed 22a, FIG. 2, has been separated in the direction of current flow into three sections 40, 42 and 44 by insulating plates 46 and 48. The insulating plates 46 and 48 may be formed of porous (e.g., fiberglass cloth) or non-porous electrically insulating material as appropriate for controlling fluid flow. Each of these sections 40, 42 and 44 contains at either end an electrode 50, 52; 54, 56; 58, 60, respectively. In one construction electrodes 54 and 58 may be connected in series by line 62 and electrodes 52 and 56 may be connected in series by line 64 so that an uninterrupted electrical path exists from input lead 66 through electrode 50, section 40, electrode 52, lead 64, electrode 56, section 42, electrode 54, lead 62, electrode 58, section 44, electrode 60, and out lead 70. Alternatively, if it is desired to operate bed 22a with multiphase electrical power, for example three-phase, then three separate leads 66, 72 and 74 can be provided to electrodes 50, 54 and 58. In that case leads 76 and 78 from electrodes 52 and 56 can be both connected to ground 80 while lead 70 acts as a return. Again, the electrical current flows in a path which is transverse to the flow of the fluid. A different three-phase delta connection is shown in FIG. 2B. With this connection lead 66a representing phase a, is connected to electrode 50 of bed section 40 and to electrode 56 of section 42. Lead 72a, representing phase b, is connected to both electrode 54 of section 42 and electrode 58 of section 44. Finally, lead 74a, representing phase c, is connected to electrode 52 of section 40 and to electrode 60 of section 44.

An alternative three phase wye connection is shown in FIG. 2C. With this connection, leads 66aa, 72aa and 74aa are connected respectively to electrodes 50, 54, and 58 of sections 40, 42 and 44. Leads 76a, 78a and 70a are connected respectively at one of their ends to electrodes 52, 56 and 60 of sections 40, 42 and 44 and their other ends are connected to ground 80a.

Figure 3:
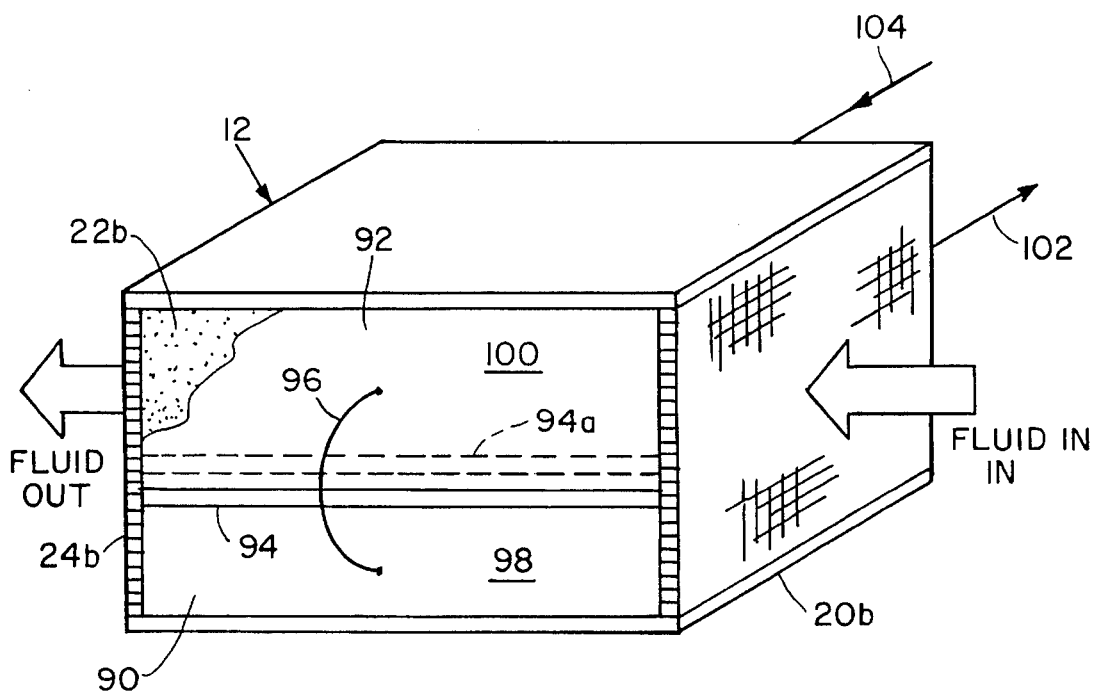
FIG. 3 is a three-dimensional view of a bed similar to that shown in FIG. 1 which is horizontally sectioned to compensate for variation in resistance due to compaction of the carbon granules by gravity.

In order to overcome the non-uniformity introduced by the compaction of the carbon granules due to gravity, the bed 22b, FIG. 3, may be separated into two or more sections 90, 92, by an insulating plate 94. The lower section 90, being more severely compacted by the force of gravity, will have higher conductivity, that is, lower resistance, because the granules are in better contact with each other and so the bottom section 90 has a lower height than upper section 92 in order that the reduced cross section area of section 90 with respect to that of section 92 will balance the increased conductivity of section 90 with respect to section 92 so that the resistance of both sections 90, 92 will be approximately equal. Sections 90 and 92 are connected in series by lead 96 interconnected between their respective electrodes 98 and 100. The power may be applied through leads 104 and 102.

Alternatively, insulating plate 94a, shown in phantom, which is attached to the vessel walls, can be used to divide the bed into two horizontal sections of equal height. In this case the plate 94a supports the weight of the bed, thereby providing two horizontal sections with equal heights and equal resistances. More than one horizontal insulating plate could be utilized.

Figure 4:
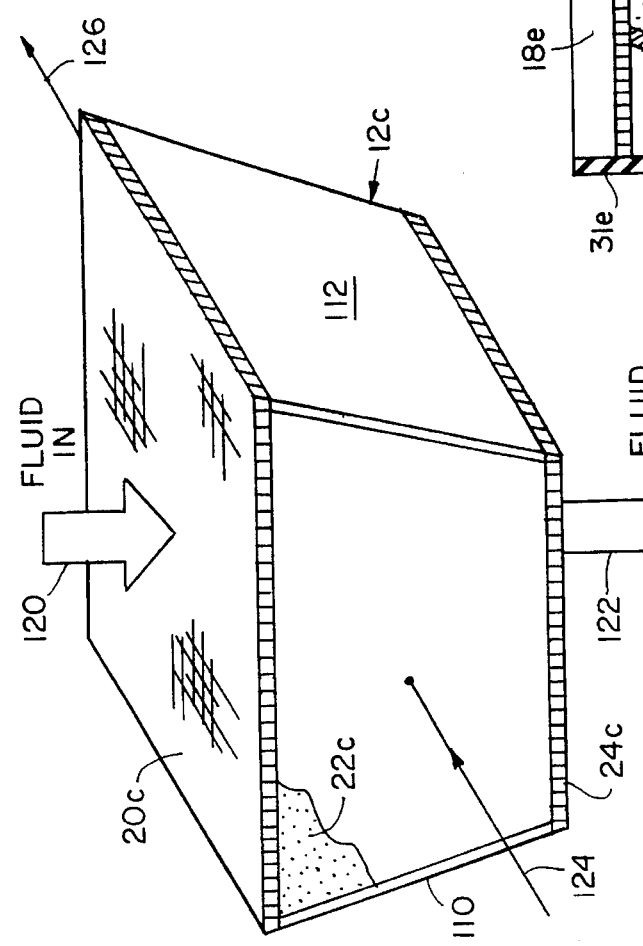
FIG. 4 is a view similar to FIG. 3 wherein the bed is provided with one or more sloping walls to assume a portion of the weight of the bed and thereby alleviate some of the compaction and resistance variation introduced by the force of gravity.

Another alternative technique for overcoming the non-uniformity of resistance introduced in the bed by the force of gravity is shown in FIG. 4, where the sides 110 and 112 of container 12c have been made sloping so that they incline inwardly from top to bottom and thereby assume a portion of the weight of the carbon granules of the carbon granular bed against the force of gravity and thereby reduce the compaction at the lower end relative to the upper end of bed 22c and provide for more uniformity in the electrical resistance throughout. Once again, the flow, as indicated by arrows 120, 122, is transverse to the path of the current which flows from lead 124 between the electrodes and across the bed and out lead 126. One, two or all of the walls may be so inclined to combat the forces of gravity. In a simple cylindrical container there would be a single sloping wall and the cylinder would take the form of a truncated cone.

Figure 5:
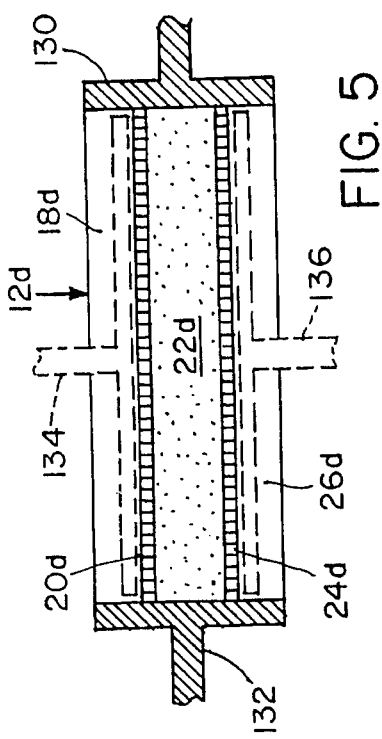
FIG. 5 is a cross-sectional view of the system of FIG. 1 taken along line 5—5 with sloped electrodes to compensate for lower resistivity at the bed bottom.
Figure 6:
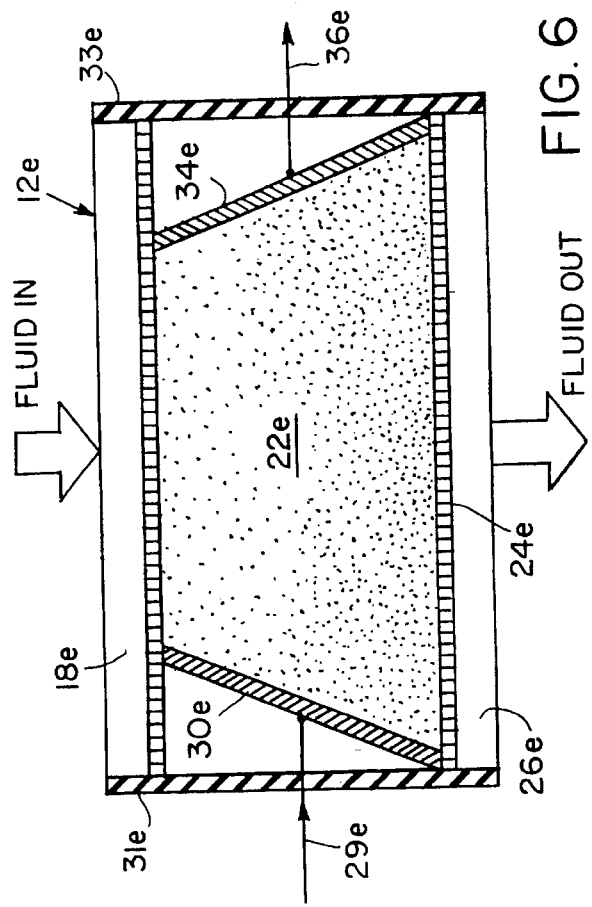

Yet another alternative technique for overcoming the problems associated with the non-uniformity of resistance of the bed 22e of containment vessel 12e due to the force of gravity is shown in FIG. 6. FIG. 5 is a cross-sectional view of the system of FIG. 1; however, in this embodiment the electrodes 30e and 34e are sloped and converge from bottom to top to compensate for the increasing electrical resistance of the bed from bottom to top. Since these opposing electrodes are more closely spaced at the top of the bed where the bed resistance is higher than at the bottom where resistance is lower, the overall bed resistance between the electrodes is equalized.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A transverse flow self-heating electrically conductive sorption system for separating species of different adsorption characteristics in a fluid, comprising:

a containment vessel;

an electrically conductive permeable sorbent bed having a multiplicity of adsorption sites in said vessel and having an electrical resistance and a flow resistance;

a porting structure for supplying contaminated fluid in a first direction at one surface of said bed and for receiving the decontaminated fluid at another surface of said bed; and a pair of spaced electrodes for applying current through said bed in a second direction transverse to said first direction to self-heat said electrically conductive permeable sorbent bed;

said bed being separated in said second direction into a plurality of sections and including means for connecting said sections in series electrically to increase the electrical resistance of said bed without increasing the flow resistance in the first direction.

2. A transverse flow self-heating electrically conductive sorption system for separating species of different adsorption characteristics in a fluid, comprising:

a containment vessel;

an electrically conductive permeable sorbent bed having a multiplicity of adsorption sites in said vessel and having a bottom, a top and an electrical resistance; said bed being separated horizontally into a plurality of sections of unequal height and including means for connecting the sections in series electrically with the height of the sections increasing from the bottom to the top of said bed for compensating for increasing electrical resistance of the bed from bottom to top due to compaction of the bed by gravity;

a porting structure for supplying contaminated fluid in a first direction at one surface of said bed and for receiving the decontaminated fluid at another surface of said bed; and a pair of spaced electrodes for applying current through said bed in a second direction transverse to said first direction to self-heat said electrically conductive permeable sorbent bed.

3. A transverse flow self-heating electrically conductive sorption system for separating species of different adsorption characteristics in a fluid, comprising:

a containment vessel;

an electrically conductive permeable sorbent bed having a multiplicity of adsorption sites in said vessel and having a bottom, a top and an electrical resistance;

a porting structure for supplying contaminated fluid in a first direction at one surface of said bed and for receiving the decontaminated fluid at another surface of said bed; and a pair of spaced electrodes for applying current through said bed in a second direction transverse to said first direction to self-heat said electrically conductive permeable sorbent bed; said electrodes are sloped and converge from the bottom of the bed to the top of the bed for compensating for the increasing electrical resistance of the bed from bottom to top.

4. The sorption system of claims 1, 2, or 3 in which said sorbent bed is granular.

5. The sorption system of claims 1, 2, or 3 in which said sorbent bed is pelletized.

6. The sorption system of claims 1, 2, or 3 in which said sorbent bed is carbon.

7. The sorption system of claims 1, 2, or 3 in which said sorbent bed is made of homogeneous material.

\* \* \* \* \*